US006426590B1

(12) United States Patent
Chung et al.

(10) Patent No.: US 6,426,590 B1
(45) Date of Patent: Jul. 30, 2002

(54) PLANAR COLOR LAMP WITH NANOTUBE EMITTERS AND METHOD FOR FABRICATING

(75) Inventors: Feng-Yu Chung; Wen-Chun Wang; Kuang-Lung Tsai, all of Hsin-Chu (TW)

(73) Assignee: Industrial Technology Research Institute, Hsin Chu (TW)

( * ) Notice: Subject to any disclaimer, the term of this patent is extended or adjusted under 35 U.S.C. 154(b) by 0 days.

(21) Appl. No.: 09/482,583

(22) Filed: Jan. 13, 2000

(51) Int. Cl.[7] .................. H01J 1/62; H01J 1/30
(52) U.S. Cl. .................. 313/496; 313/491; 313/311
(58) Field of Search .................. 313/491, 493, 313/494, 495, 496, 497, 484, 485, 634, 635, 310, 311, 312, 574, 336, 351, 422; 445/50, 24, 25; 315/169.3, 169.4

(56) References Cited

U.S. PATENT DOCUMENTS

| 5,276,378 A | * | 1/1994 | Gothard | 313/491 |
| 5,495,143 A | * | 2/1996 | Lengyel et al. | 313/309 |
| 5,903,096 A | * | 5/1999 | Winsor | 313/493 |
| 6,011,354 A | * | 1/2000 | Tsai et al. | 313/493 |
| 2002/0021082 A1 | * | 2/2002 | Uemura et al. | 313/495 |

* cited by examiner

*Primary Examiner*—Nimeshkumar D. Patel
*Assistant Examiner*—Karabi Guharay
(74) *Attorney, Agent, or Firm*—Randy W. Tung

(57) ABSTRACT

A planar color lamp powered by field emission nanotube emitters and a method for fabricating such lamp are provided. The planar color lamp is constructed with a lamp chamber having at least three spaced-apart, serpentine-shaped emitter stacks formed on a base plate, and at least three spaced-apart, serpentine-shaped fluorescent coating strips formed on a cover plate wherein each of the fluorescent coating strips emits a primary color of red, green or blue when activated by electrons emitted from the nanotube emitter stacks. The nanotube emitter stacks can be advantageously formed by a low cost, thick film printing technique with a material of a mixture of a polymeric binder and nanometer dimensioned hollow fibers such as carbon, diamond or diamond-like carbon material. The present invention planar field emission color lamp provides the advantages of a backlight and color filters into a single compact package that can be fabricated at low cost.

11 Claims, 6 Drawing Sheets

PLANAR COLOR LAMP WITH NANOTUBE EMITTERS AND METHOD FOR FABRICATING

FIELD OF THE INVENTION

The present invention generally relates to a planar color lamp for illuminating a flat panel display and more particularly, relates to a planar color lamp that utilizes field emission light source of nanotube emitters that are arranged in serpentine shape for use in the illumination of LCD or other flat panel displays and a method for fabricating such color lamp.

BACKGROUND OF THE INVENTION

In the construction of liquid crystal display (LCD) panels, a method of illumination must be utilized since the liquid crystal itself does not illuminate. The illumination is also important when the available lighting for viewing a LCD is insufficient. In order to make large LCD panels, and specifically colored LCD panels, a high efficiency light source must be used for illumination in order to achieve the requirements of small panel thickness, lightweight and low power consumption. The capability of achieving high brightness at a low power consumption is essential for obtaining a long battery life between recharging in portable applications for LCD's. In recent years, the improvements made in the other parts of a LCD display, i.e., the color filter arrays, the thin film transistors, and other performance enhancement layers reduce the overall transmittance of a liquid crystal display panel. As a result, any improvement that can be made in the brightness/power ratio must be obtained from the improvement in the backlighting efficiency of a panel.

In the conventional backlighting technology for flat panel displays, cathode fluorescent lamps are used to illuminate the flat panel display. The cathode fluorescent lamps provide the benefits of high luminous efficiency, long service life, lightweight and rugged structure. The lamps are normally installed in pairs along the sides of a display panel, e.g., a display panel in a notebook computer, with a light tube arrangement for creating uniform lighting across a diffuser screen. More recently, improvements in backlighting have been provided which include a flat fluorescent backlight and a wedge-shaped light tube which distributes the light from a single bulb evenly over the entire display surface. The wedge-shaped construction allows a single lamp to illuminate the entire liquid crystal display panel. A plastic molded light tube which contains prismatic specular reflectors helps to spread the light uniformly across a front plane of the device.

Flat fluorescent lamps have also been recently developed to directly illuminate a display panel. A typical construction of a flat fluorescent lamp device measures only 3 mm thick. Panel sizes ranging from diagonal lengths between 25 mm and 350 mm have been made by using the conventional cold cathode technology. The lamp housing can be constructed by using a formed plate and a flat plate laminated together. For instance, a typical lamp can be constructed of a serpentine channel of four intervals equipped with an electrode at each end. A typical design of the flat fluorescent lamp includes a phosphor coating on both a top and a bottom plate, while a reflective coating is placed only on the bottom plate. A high voltage of between 1 kV and 3 kV (depending on the panel size and cathode type) is normally required to operate a flat fluorescent lamp.

For a color liquid crystal display device, color filters in three basic colors of red, green and blue must be utilized. The manufacturing process for color filters involves a number of steps such as chemical vapor deposition, spin coating of insulators and metals, and the planarization and orientation film coatings. Color filters can be formed on glass substrates by complicated processing steps which include glass finishing and preparation of both the front and the back of a substrate, the polishing and lapping process, the washing and cleaning of the substrate, the coating, curing and other steps which must be performed on the substrate.

The formation of color filters requires a repetitive process to be carried out for forming the three primary color elements. Inbetween the color elements, a black border or a black matrix is needed for providing the necessary contrast. To prepare the color filters, either an organic dye or a pigment can be used as long as it is suitable as a light absorbing color filter material. For instance, a gelatin can be deposited and dyed in successive photolithographic operations by using proximity printing equipment and standard photoresist materials. A pigment dispersion method can also be used which eliminates the gelatin layer and is capable of higher temperature stability. Other methods for forming color filters include electrodeposition and printing.

FIG. 1A shows a conventional color filter device 110 consisting of three primary color filters, i.e., red filter 112, green filter 114 and blue filter 116. A white light source 120 is used for backlighting the single pixel 110. In this conventional color filter/backlighting arrangement, a large area is occupied by a single pixel and as a result, the resolution achieved on a liquid crystal display panel is relatively poor.

In another conventional color filter/backlighting device as shown in FIG. 1B, in the same area that was occupied by a single pixel where a white light backlighting is used, three pixels are arranged wherein each pixel can be one of the three primary colors by utilizing three different light sources 124, 126 and 128 for each pixel. Significant improvement in resolution is therefore possible due to the greatly reduced sizes of the pixels. The color filters used in this arrangement, 130, 132 and 134 are essentially transparent for accepting a color from the color sources 124, 126 and 128. This arrangement is known as a sequential color display. In the sequential color display arrangement, a cathode-ray tube is normally employed as a light source that emits light at a plurality of wavelengths. Since there is an inherent light loss created by the polarization of the emitted light and the duty cycle of the liquid crystal cell, the maximum efficiency for the transmitted white light is reduced to as low as 25%. The display brightness in a field sequential color display is therefore a major concern.

In recent years, flat panel display devices have been developed and widely used in electronic applications such as personal computers. One of the popularly used flat panel display device is an active matrix liquid crystal display which provides improved resolution. However, the liquid crystal display device has many inherent limitations that render it unsuitable for a number of applications. For instance, liquid crystal displays have numerous fabrication limitations including a slow deposition process for coating a glass panel with amorphous silicon, high manufacturing complexity and low yield for the fabrication process. Moreover, the liquid crystal display devices require a fluorescent backlight which draws high power while most of the light generated is wasted. A liquid crystal display image is also difficult to see under bright light conditions or at wide viewing angles which further limit its use in many applications.

Other flat panel display devices have been developed in recent years to replace the liquid crystal display panels. One of such devices is a field emission display device that overcomes some of the limitations of LCD and provides significant advantages over the traditional LCD devices. For instance, the field emission display devices have higher contrast ratio, larger viewing angle, higher maximum brightness, lower power consumption and a wider operating temperature range when compared to a conventional thin film transistor (TFT) liquid crystal display panel.

A most drastic difference between a FED and a LCD is that, unlike the LCD, FED produces its own light source utilizing. colored phosphors. The FEDs do not require complicated, power-consuming backlights and filters and as a result, almost all the light generated by a FED is visible to the user. Furthermore, the FEDs do not require large arrays of thin film transistors, and thus, a major source of high cost and yield problems for active matrix LCDs is eliminated.

In a FED, electrons are emitted from a cathode and impinge on phosphors coated on the back of a transparent cover plate to produce an image. Such a cathodoluminescent process is known as one of the most efficient methods for generating light. Contrary to a conventional CRT device, each pixel or emission unit in a FED has its own electron source, i.e., typically an array of emitting microtips. A voltage difference existed between a cathode and a gate electrode which extracts electrons from the cathode and accelerates them toward the phosphor coating. The emission current, and thus the display brightness, is strongly dependent on the work function of the emitting material. To achieve the necessary efficiency of a FED, the cleanliness and uniformity of the emitter source material are very important.

In order for the electron to travel in a FED, the FEDs are evacuated to a low pressure such as $10^{-7}$ torr in order to provide a long mean free path for the emitted electrons and to prevent contamination and deterioration of the microtips. The resolution of the display can be improved by using a focus grid to collimate electrons drawn from the microtips.

In the early development for field emission cathodes, a metal microtip emitter of molybdenum was utilized. In such a device, a silicon wafer is first oxidized to produce a thick silicon oxide layer and then a metallic gate layer is deposited on top of the oxide. The metallic gate layer is then patterned to form gate openings, while subsequent etching of the silicon oxide underneath the openings undercuts the gate and creates a well. A sacrificial material layer such as nickel is deposited to prevent deposition of nickel into the emitter well. Molybdenum is then deposited at normal incidence such that a cone with a sharp point grows inside the cavity until the opening closes thereabove. An emitter cone is left when the sacrificial layer of nickel is removed.

In an alternate design, silicon microtip emitters are produced by first conducting a thermal oxidation on silicon and then followed by patterning the oxide and selectively etching to form silicon tips. Further oxidation or etching protects the silicon and sharpens the point to provide a sacrificial layer. In another alternate design, the microtips are built onto a substrate of a desirable material such as glass, as an ideal substrate for large area flat panel displays. The microtips can be formed of conductive materials such as metals or doped semi-conducting materials. In this alternate design for a FED device, an interlayer that has controlled conductivity deposited between the cathode and the microtips is highly desirable. A proper resistivity of the interlayer enables the device to operate in a stable condition. In fabricating such FED devices, it is desirable to deposit an amorphous silicon film which has electrical conductivity in an intermediate range between that of intrinsic amorphous silicon and n+doped amorphous silicon. The conductivity of the n+doped amorphous silicon can be controlled by adjusting the amount of phosphorous atoms contained in the film.

Generally, in the fabrication of a FED device, the device is contained in a cavity of very low pressure such that the emission of electrons is not impeded. For instance, a low pressure of $10^{-7}$ torr is normally required. In order to prevent the collapse of two relatively large glass panels which form the FED device, spacers must be used to support and provide proper spacing between the two panels. For instance, in conventional FED devices, glass spheres or glass crosses have been used for maintaining such spacings in FED devices. Elongated spacers have also been used for such purpose.

Referring initially to FIG. 2A wherein an enlarged, cross-sectional view of a conventional field emission display device 10 is shown. The FED device 10 is formed by depositing a resistive layer 12 of typically an amorphous silicon base film on a glass substrate 14. An insulating layer 16 of a dielectric material and a metallic gate layer 18 are then deposited and formed together to provide metallic microtips 20 and a cathode structure 22 is covered by the resistive layer 12 and thus, a resistive but somewhat conductive amorphous silicon layer 12 underlies a highly insulating layer 16 which is formed of a dielectric material such as $SiO_2$. It is important to be able to control the resistivity of the amorphous silicon layer 12 such that it is not overly resistive but yet, it will act as a limiting resistor to prevent excessive current flow if one of the microtips 20 shorts to the metal layer 18.

A completed FED structure 30 including anode 28 mounted on top of the structure 30 is shown in FIG. 2B. It is to be noted, for simplicity reasons, the cathode layer 22 and the resistive layer 12 are shown as a single layer 22 for the cathode. The microtips 20 are formed to emit electrons 26 from the tips of the microtips 20. The gate electrodes 18 are provided with a positive charge, while the anode 28 is provided with a higher positive charge. The anode 28 is formed by a glass plate 36 which is coated with phosphorous particles 32. An intermittent conductive layer of indium-tin-oxide (ITO) layer 34 may also be utilized to further improve the brightness of the phosphorous layer when bombarded by electrons 26. This is shown in a partial, enlarged cross-sectional view of FIG. 2C. The total thickness of the FED device is only about 2 mm, with vacuum pulled inbetween the lower glass plate 14 and the upper glass plate 36 sealed by sidewall panels 38 (shown in FIG. 2B).

The conventional FED devices formed by microtips shown in FIGS. 2A~2C produce a flat panel display device of improved quality when compared to liquid crystal display devices. However, a major disadvantage of the microtip FED device is the complicated processing steps that must be used to fabricate the device. For instance, the formation of the various layers in the device, specifically the formation of the microtips, requires a thin film deposition technique utilizing a photolithographic method. As a result, numerous photomasking steps must be performed in order to define and fabricate the various structural features in the FED. The CVD deposition processes and the photolithographic processes involved greatly increase the manufacturing cost of a FED device.

In a copending application, Attorney's Docket No. 64,600-050, assigned to the common assignee of the present invention, a field emission display device and a method for fabricating such device of a triode structure by using nanotube emitters as electron emission sources were disclosed. In the triode structure FED device, the device is constructed by a first electrically insulating plate, a cathode formed on the first electrically insulating plate by a material that includes metal, a layer formed on the cathode of a high electrical resistivity material, a layer of nanotube emitter formed on the resistivity layer of a material of carbon, diamond or diamond-like carbon wherein the cathode, the resistivity layer and the nanotube emitter layer form an emitter stack insulated by an insulating rib section from adjacent emitter stacks, a dielectric material layer perpendicularly overlying a multiplicity of the emitter stacks, a gate electrode on top of the dielectric material layer, and an anode formed on a second electrically insulating plate overlying the gate electrode. The FED device proposed can be fabricated advantageously by a thick film printing technique at substantially lower fabrication cost and higher fabrication efficiency than the FEDs utilizing microtips. However, three separate electrodes are still required for the device, i.e., a cathode, a gate electrode and an anode.

It is therefore an object of the present invention to provide a planar field emission color lamp that utilizes nanotube emitters which does not have the drawbacks or shortcomings of the conventional color lamps.

It is another object of the present invention to provide a planar field emission color lamp that utilizes nanotube emitters which does not require the fabrication of complicated microtip electron emitters.

It is a further object of the present invention to provide a planar field emission color lamp that utilizes nanotube emitters wherein the nanotube emitters are formed of nanometer dimensioned hollow fibers that are electrically conductive.

It is another further object of the present invention to provide a planar field emission color lamp that utilizes nanotube emitters as electron sources wherein the nanotube emitters can be advantageously formed by a thick film printing technique.

It is still another object of the present invention to provide a planar field emission color lamp that utilizes nanotube emitters wherein the nanotubes are provided in a material of carbon, diamond-like carbon or diamond.

It is yet another object of the present invention to provide a planar field emission color lamp that utilizes nanotube emitters for emitting electrons which are formed in a serpentine-shape on a base insulating plate of the lamp.

It is still another further object of the present invention to provide a planar field emission color lamp that utilizes nanotube emitters as the electron source and fluorescent coating strips formed in serpentine-shape on a cover plate for activation by the electrons emitted from the nanotube emitters.

It is yet another further object of the present invention to provide a method for fabricating a planar field emission color lamp with nanotube emitters by a thick film printing technique such that serpentine-shaped nanotube emitters and fluorescent coating strips can be formed on a base plate and on a cover plate, respectively of the color lamp.

SUMMARY OF THE INVENTION

In accordance with the present invention, a planar field emission type color lamp that is equipped with nanotube emitters and a method for fabricating such color lamp are provided.

In a preferred embodiment, a planar field emission color lamp that utilizes nanotube emitters can be provided which includes a lamp body that has an electrically insulating cover plate, an insulating base plate, two side walls and two end walls forming a sealed cavity therein, at least three spaced-apart, serpentine-shaped emitter stacks formed on the electrically insulating base plate, each of the at least three serpentine-shaped emitter stacks being positioned substantially parallel to the two end walls and is formed by a layer of a first electrically conductive material and a layer of nanotube emitter on top, a layer of a second electrically conductive material on a surface of the electrically insulating cover plate that faces the cavity, at least three spaced-apart, serpentine-shaped fluorescent coating strips on the layer of the second electrically conductive material corresponding in a mirror image relationship to the at least three emitter stacks when the cover plate is positioned over the base plate forming the lamp body, each of the at least three fluorescent coating strips is adapted for emitting a red, green or blue light upon activation by electrons emitted from the at least three emitter stacks, and a plurality of electrically insulating spacers inbetween the cover plate and the base plate for maintaining a preset spacing thereinbetween.

In the planar field emission type color lamp that has nanotube emitters, the layer of nanotube emitters may be formed of a mixture of nanometer dimensioned hollow tubes and a binder material. The electrically insulating cover plate may further include a black matrix layer inbetween the at least three spaced-apart, serpentine-shaped fluorescent coating strips. The black matrix layer may be formed of an electrically conductive material for dispersing charges carried by the electrons when bombarded on the black matrix layer. The cover plate and the base plate may be formed of a ceramic material that is substantially transparent. The layer of a first electrically conductive material may be a cathode for the planar field emission color lamp. The layer of a first electrically conductive material may be a silver paste, while the layer of the second electrically conductive material is an anode for the planar field emission color lamp and may be formed of indium-tin-oxide (ITO). The layer of nanotube emitter may be formed of a mixture of nanometer dimensioned hollow tubes of carbon, diamond or diamond-like carbon and a polymeric-based binder. Each of the at least three fluorescent coating strips emits a light of red, green or blue that is different than the light emitted by its immediate adjacent strips when activated by electrons from the at least three emitter stacks.

The present invention is further directed to a method for fabricating a planar field emission color lamp that utilizes nanotube emitters which can be carried out by the operating steps of providing an electrically insulating base plate, forming at least three spaced-apart serpentine-shaped emitter stacks on the electrically insulating base plate by a thick film printing method substantially parallel to a transverse direction of the base plate, each of the at least three emitter stacks includes a layer of a first electrically conductive material and a layer of nanotube emitter on top, providing an electrically insulating cover plate, forming a layer of a second electrically conductive material on a surface of the electrically insulating cover plate facing the electrically insulating base plate when the cover plate and the base plate are assembled together, forming at least three spaced-apart, serpentine-shaped fluorescent coating strips on the layer of the second electrically conductive material corresponding to the positions of the at least three emitter stacks for emitting a red, green or blue light when activated by electrons emitted from the emitter stacks, and joining the electrically insulating base plate and cover plate together by side panels forming a vacuum-tight cavity therein.

The method for fabricating a planar field emission color lamp with nanotube emitters may further include the step of providing the cover plate and the base plate in substantially transparent glass. The method may further include the step of printing the layer of the first electrically conductive material in a silver paste. The method may further include the step of screen printing the layer of nanotube emitters from a mixture of a binder and nanometer dimensioned hollow fibers selected from carbon fibers, diamond fibers, and diamond-like carbon fibers. The method may further include the step of providing a negative charge to the first electrically conductive material underlying the plurality of emitter stacks and providing a positive charge to the layer of second electrically conductive material. The layer of the second electrically conductive material may be formed of indium-tin-oxide. The method may further include the step of coating a black matrix layer on the electrically insulating cover plate inbetween the at least three strips of fluorescent coating. The at least three fluorescent coating strips may be formed by a thick film printing technique. The at least three fluorescent coating strips may be formed such that each strip emits a red, green or blue light that is different than its immediate adjacent strips when activated by electrons from the plurality of emitter stacks. The method may further include the step of forming the at least three fluorescent coating strips by a material that includes phosphor. The method may further include the step of forming six spaced-apart, serpentine-shaped fluorescent coating strips for emitting color lights in the order of red, green, blue, red, green and blue.

BRIEF DESCRIPTION OF THE DRAWINGS

These and other objects, features and advantages of the present invention will become apparent from the following detailed description and the appended drawings in which.

DETAILED DESCRIPTION OF THE PREFERRED AND ALTERNATE EMBODIMENTS

Figure 1A:
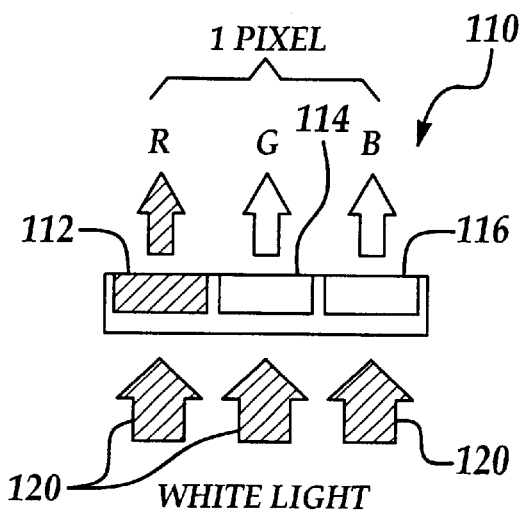
FIG. 1A is a schematic illustrating a conventional color lamp formed by color filters and a white light source.
Figure 1B:
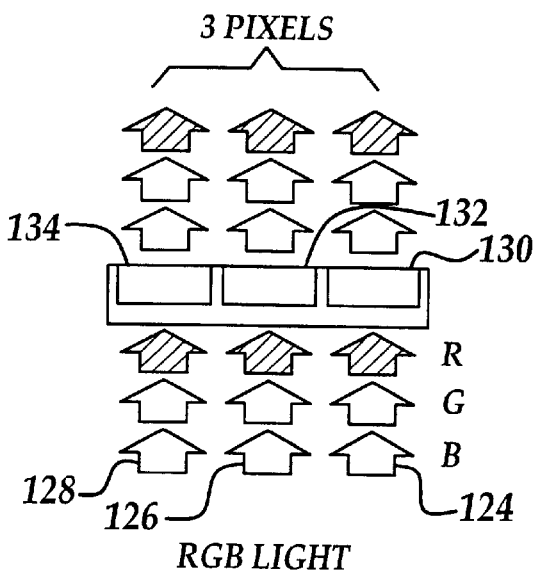
FIG. 1B is a schematic illustrating a conventional sequential color display device wherein each pixel displays red, green or blue.

The present invention discloses a planar field emission color lamp for illuminating flat panel displays that has a lamp body formed of a cover plate and a base plate with at least three serpentine-shaped emitter stacks formed on the base plate and at least three serpentine-shaped fluorescent coating strips formed on the cover plate each exhibiting one of the primary colors of red, green and blue such that when the different channels are turned on sequentially, red, green and blue lights emit from the lamp so that the color lamp serves the functions of both a backlight and a color filter. The field emission type color lamp utilizes a diode structure and electron emitters formed by nanotube materials which can be fabricated by a low cost thick film printing technique, for instance, by a screen printing or by a ink-jet printing technique. The present invention novel planar field emission type color lamp can be easily constructed and operated at low driving voltage resulting in higher operating efficiency.

In the field emission display panel of the present invention structure, a single cathode and a single anode are utilized in a diode structure. The single cathode may be advantageously formed of a silver paste or of any other conductive paste material or film. The anode may be advantageously formed of an indium-tin-oxide layer on a top insulating plate, i.e., an optically transparent glass plate. The ITO material is substantially transparent and therefore does not affect the function of the display panel.

The diode structure is formed by first providing a transparent glass plate as the bottom insulating plate, then forming a plurality of serpentine-shaped emitter stacks on the glass plate by a thick film printing technique such as screen printing or ink-jet printing of nanometer dimensioned hollow tubes or fibers such as carbon fiber, diamond fiber or diamond-like carbon fiber.

On a top insulating plate, i.e., a second glass plate, a transparent electrode material such as indium-tin-oxide (ITO) is coated before a multiplicity of serpentine-shaped fluorescent powder coating strips are formed on the ITO layer or the anode layer. The multiplicity of strips of fluorescent powder coating emits red, green or blue light upon activation by the electrons emitted from the plurality of emitter stacks. Each of the fluorescent coating strip emits a light that is different in color than those emitted by its immediate adjacent coating strips. A plurality of side panels, i.e., four side panels may be used to join the peripheries of the first and the second glass plates together by utilizing a glass frit material to form a vacuum-tight cavity therein.

The electron emission source of the present invention novel diode structure field emission is the thick film printed cathode layer of a nanotube emitter on top of a silver paste. The thick film printing technique utilized may be a screen printing technique or a ink-jet printing technique. The thick film printing method is most suitable for fabricating field emission display panels of large size such that the fabrication process can be carried out in an efficient manner. It has been found that, by utilizing the thick film printing technique, a printing resolution as high as 100 µm can be achieved. The present invention novel thick film printing method can therefore be used for fabricating field emission display panels in a VGA format such as 640×480 or larger.

On the anode formed of a transparent electrode material such as indium-tin-oxide, at least three serpentine-shaped fluorescent coating strips are formed by a thick film printing technique. The multiplicity of fluorescent coating strips are formed of a fluorescent powder material, such as phosphor, for emitting different lights of red, green or blue in an alternating manner such that each strip emits a different colored light than its immediate adjacent strips.

Figure 3:
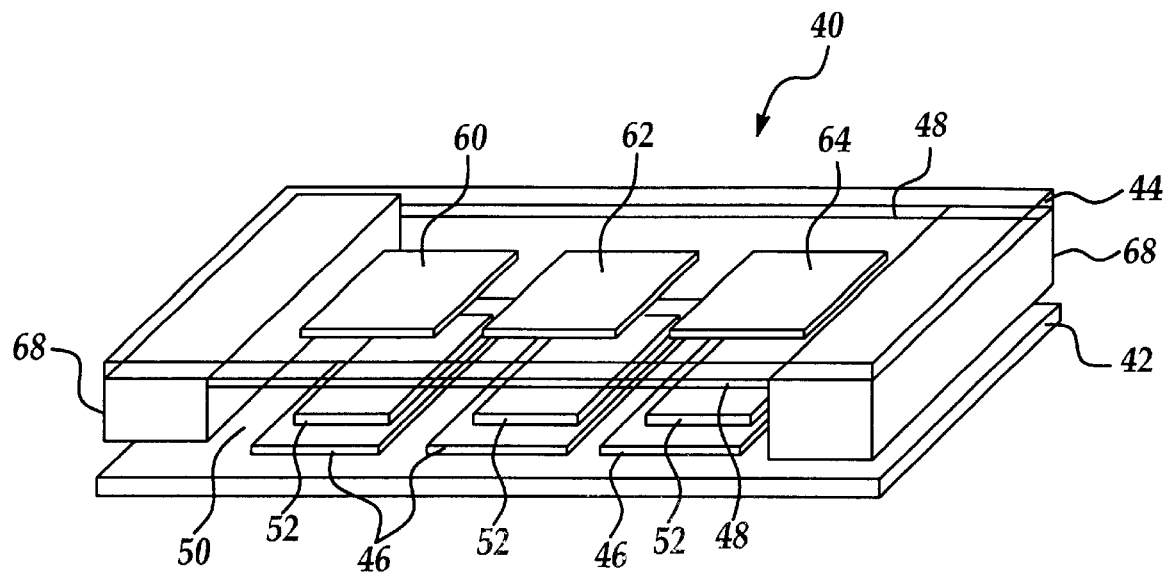
FIG. 3 is a partial, perspective view of a present invention planar field emission color lamp with a diode structure.
Figure 4:
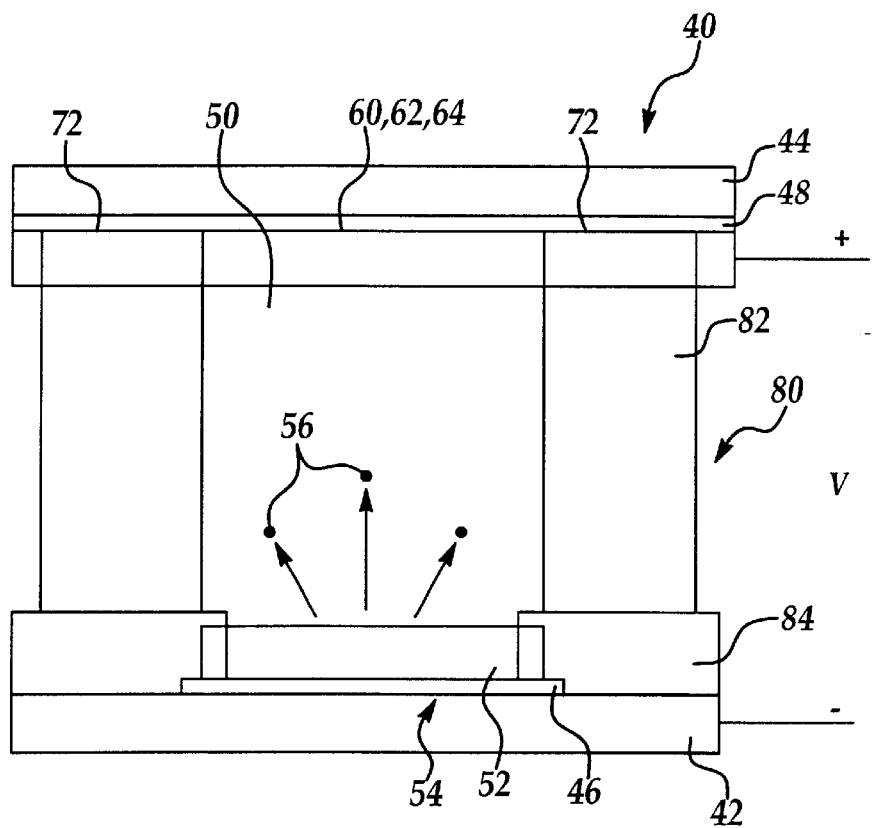
FIG. 4 is an enlarged, partial cross-sectional view of a single emitter stack and a single fluorescent coating strip of the present invention planar field emission color lamp of FIG. 3.

Referring initially to FIG. 3 wherein a partial, perspective view of the present invention field emission color lamp 40 is shown. The field emission color lamp 40 is constructed by a base insulating plate 42 and a top insulating plate 44. The insulating plates 42, 44 may be suitably formed of an optically transparent glass plate. On top of the base glass plate 42, is first formed a plurality of coating strips 46 of an electrically conductive material, such as a silver paste. Any other electrically conductive paste material formed by metallic particles mixed in a binder may also be used. The silver paste strips 46 are utilized as the cathode and are connected (not shown) to a negative charge. This is shown in FIG. 4 in a cross-sectional view. On an inside surface of the top insulating plate 44, is formed an electrically conductive layer 48 by a material such as indium-tin-oxide (ITO). The ITO layer 48 is used as the anode for carrying a positive charge and effecting an electric field in the cavity 50 formed between the top glass plate 44 and the bottom glass plate 42.

On top of the electrically conductive layer 46 of silver paste, is formed a nanotube emitter layer 52 which forms an emitter stack 54 together with the silver paste layer 46. The nanotube emitter layer 52 emits electrons 56 when charged by the silver paste layer 46 with a negative electric charge. The nanotube emitter layer 52 can be deposited by a thick film printing technique on top of the silver paste layer 46. The nanotube emitter layer 52 can be suitably formed of carbon nanotubes, diamond nanotubes or diamond-like carbon nanotubes that are fractured and mixed with a solvent-containing paste in a consistency that is suitable for thick film printing techniques, including screen printing and inkjet printing. Any other suitable nanotube materials, as long as having a diameter that is between about 30 and about 50 nanometers may also be used. It should be noted that the nanotubes are hollow tubes formed in columnar shape and are normally smaller than the diameter of a fiber. A low operating voltage of between about 30 and about 50 volts is normally used to activate the nanotube emitter materials for emitting electrons. This operating voltage is significantly smaller than that normally required for operating microtips in a conventional FED device, i.e., at larger than 100 volts.

Figure 6:
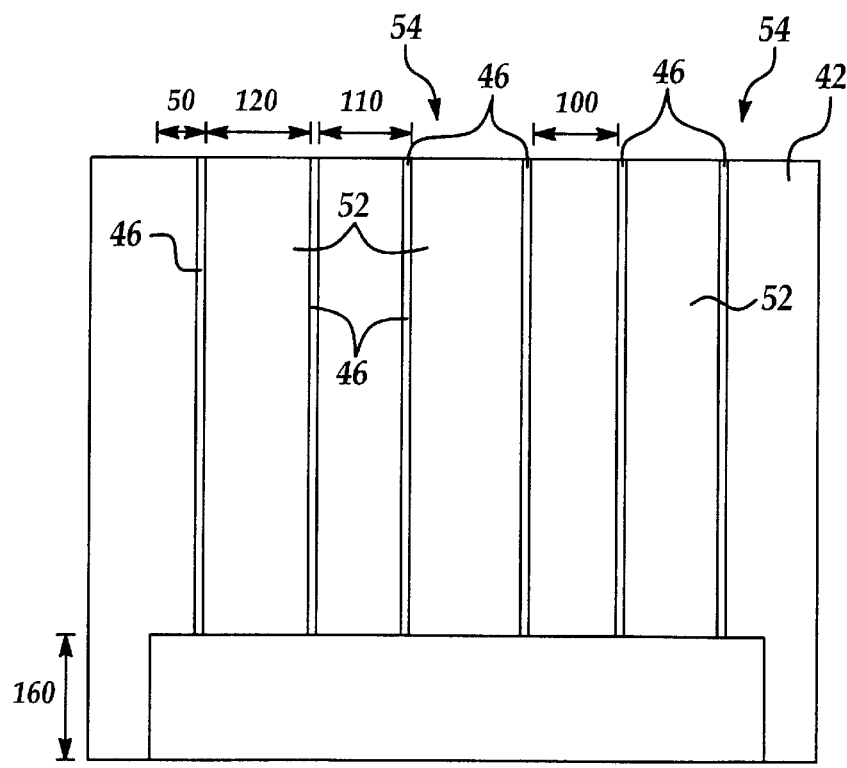
FIG. 6 is a partial, plane view of an insulating base plate of the present invention planar field emission color lamp that is coated with nanotube emitters.

After the serpentine-shaped nanotube emitter layer 52 is screen printed on the silver paste layer 46, the layer is hard baked to drive out residual solvents contained in the paste material and to cure the material. The nanotube emitter material frequently contains between about 20 wt % and about 80 wt % of nanotubes while the remainder is a solvent-containing binder. Preferably, the nanotube paste contains about 50 wt % nanotubes and about 50 wt % of the solvent-containing binder. After the hard bake step, tips or sharp points of the nanotubes protrude above the surface of the nanotube layer for use as electron emission sources and to enable the function of the present invention novel device. A multiplicity of the serpentine-shaped emitter stacks 54 can be formed on the base glass plate 42 in a transverse direction which are spaced-apart with a gap of about 110 µm thereinbetween. This is shown in FIG. 6 in a partial, plane view for the bottom glass plate 42. Similarly, a partial, plane view of the top glass plate 44 is shown in FIG. 4.

The carbon nanotube material may be formed of hollow tubes which are either single-walled or multi-walled nanotubes. The nanotubes, after being fractured, may have a length between about 1 µm and about 3 µm. The nanotubes may have an outside diameter between about 5 µm and about 50 nm which relates to an aspect ratio of about 100, when the length is 1 µm and the diameter is 10 µm.

On an inside surface of the top glass plate 44, a layer of a transparent electrode material 48 is deposited for use as an anode. The transparent electrode 48 can be suitably a material such as indium-tin-oxide which does not affect the optical characteristics of the display panel. On top of the transparent electrode 48, is then deposited by a thick film printing technique a multiplicity of strips of fluorescent powder coating 60, 62 and 64. The fluorescent coating strips are arranged in such a way that each of the strips emits a color of red, green or blue which is different than the color emitted by its immediate adjacent strips. For instance, the strip 60 emit red color, the strip 62 emit green color while the strip 64 emit blue color. For each group of the red, green and blue strips, a single pixel element is formed. The fluorescent powder coating can be suitably a phosphor powder wherein different grades of the powder emits a different red, green or blue color. Also shown in FIG. 3, are spacers 68 which are utilized for maintaining a suitable spacing between the top glass plate 44 and the base glass plate 42. The spacer 68 may be suitably formed of an insulating material by a screen printing technique or prefabricated and placed between the two glass plates.

Inbetween the phosphor coating strips 60, 62 and 64, a black matrix layer 72 may be formed for blocking out undesirable light and improving the contrast of the display panel. The black matrix material can be suitably a carbon loaded polymeric material that is applied by a screen printing technique. Optionally, a plurality of rib sections 80 consisting of a top portion 82 and a base portion 84, shown in FIG. 4, in a cross-sectional view may be provided inbetween the serpentine-shaped emitter stacks.

Figure 5:
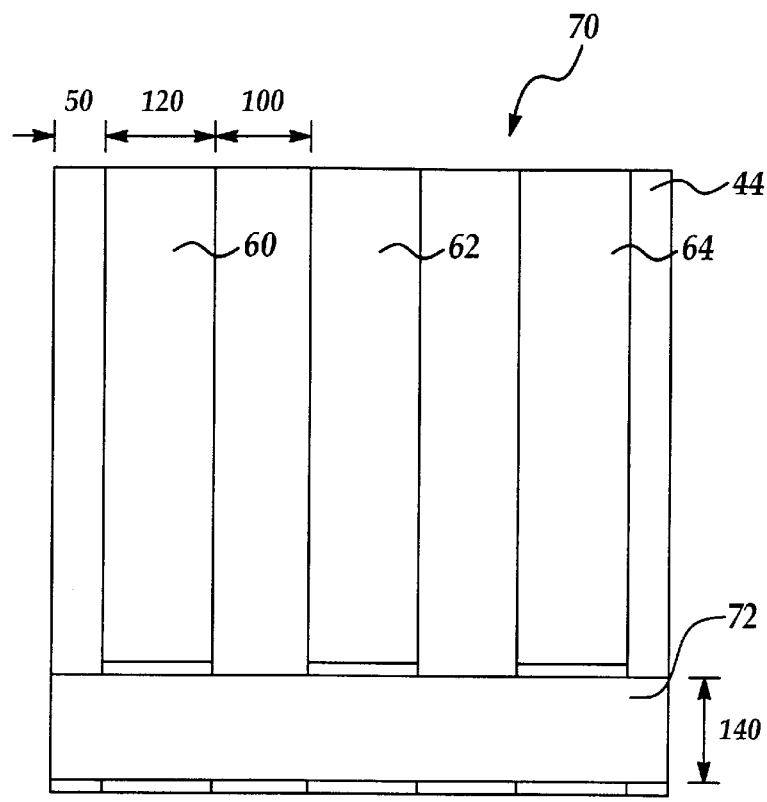
FIG. 5 is a partial, plane view of a insulating cover plate of the present invention planar field emission color lamp that is coated with red, green and blue fluorescent coating strips.

FIGS. 5 and 6 illustrate plane views of the present invention top glass plate 44 and base glass plate 42. A section of the serpentine-shaped fluorescent coating strips 70 is shown in FIG. 5 illustrates a fluorescent coating strip 60 for the red color, a fluorescent coating strip 62 for the green color and a fluorescent coating strip 64 for the blue color. A black matrix layer 72 is used to block off undesirable lights and to improve the contrast of the pixel element. The black matrix layer 72 is normally formed of an electrical conductive material such as a carbon loaded polymeric material so that electrons bombarded on the black matrix layer 72 can be readily dissipated without causing damage to the layer. Each of the pixel element 70 can be separately controlled by the nanotube emitters 52 coated on an electrically conductive layer 46 of silver paste material. Rib sections 80 may optionally be utilized for insulating between the various nanotube stacks 54.

Suitable dimensions for the present invention flourescent coating strips 70 are shown in FIGS. 5 and 6. For instance, the strips of fluorescent powder coating may have a width of approximately 120 μm. The black matrix layer may have a width of about 140 μm. The spacing between the strips of fluorescent powder coating 60, 62 and 64 is about 100 μm.

As shown in FIG. 6, the nanotube emitter may have a width of about 120 μm. The spacing between the nanotube emitters is about 110 μm, while the spacing between the conductive coating layer, i.e., the silver paste layer 46 is about 100 μm.

Figure 8:
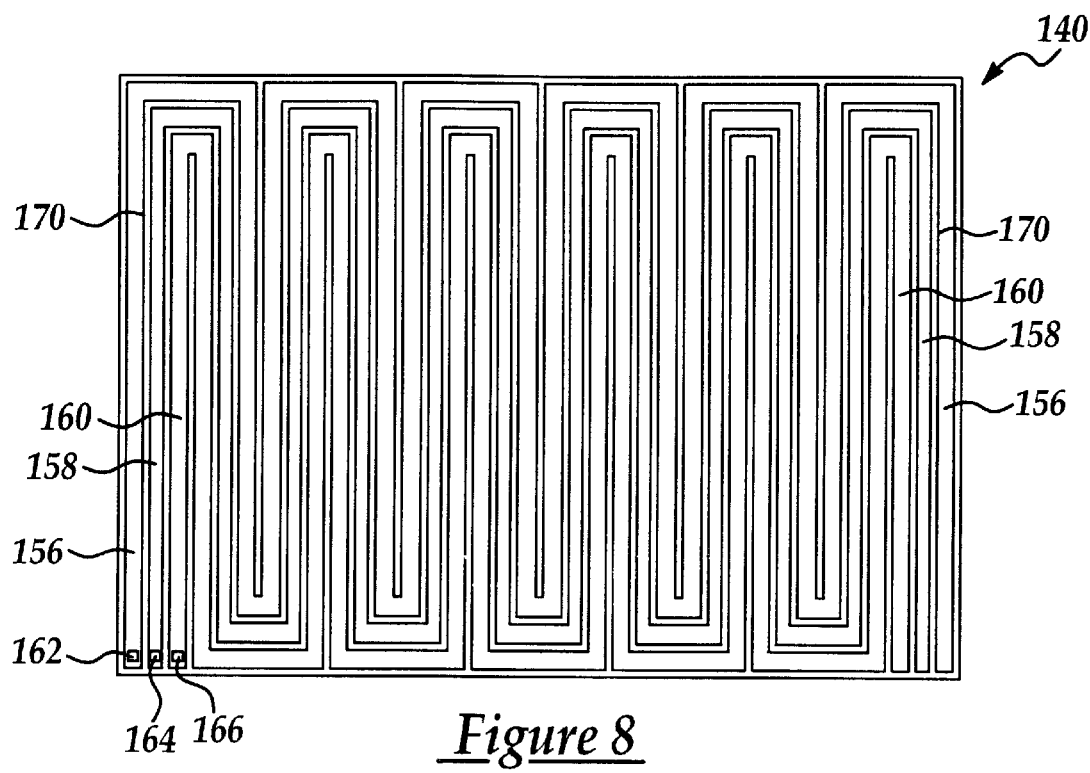
FIG. 8 is a plane view of the base plate for the present invention planar field emission color lamp that is coated with serpentine-shaped emitter stacks corresponding to the positions of the fluorescent coating strips of FIG. 9.

Referring now to FIG. 8, wherein it is shown a plane view of a base plate 140 for the present invention novel planar field emission color lamp 40. The base plate 140 is formed with at least three spaced-apart, serpentine-shaped emitter stacks 156, 158 and 160 having a space 170 thereinbetween. Each of the at least three emitter stacks is formed on an electrically conductive material layer (not shown) and is charged at electrodes 162, 164 and 166. It should be noted that a corner (or a section) of the base plate 140 is shown in FIG. 3 wherein emitter stacks 52 are shown corresponding to emitter stacks 156, 158 and 160 of FIG. 8. The width X of the emitter stacks shown in FIG. 8 is about 120 Am, similar to that shown in FIG. 6. It should be noted that the space 170 provided between the emitter stacks 156, 158 and 160 may further be formed of rib sections, similar to that shown in FIG. 4 as rib 80.

Figure 9:
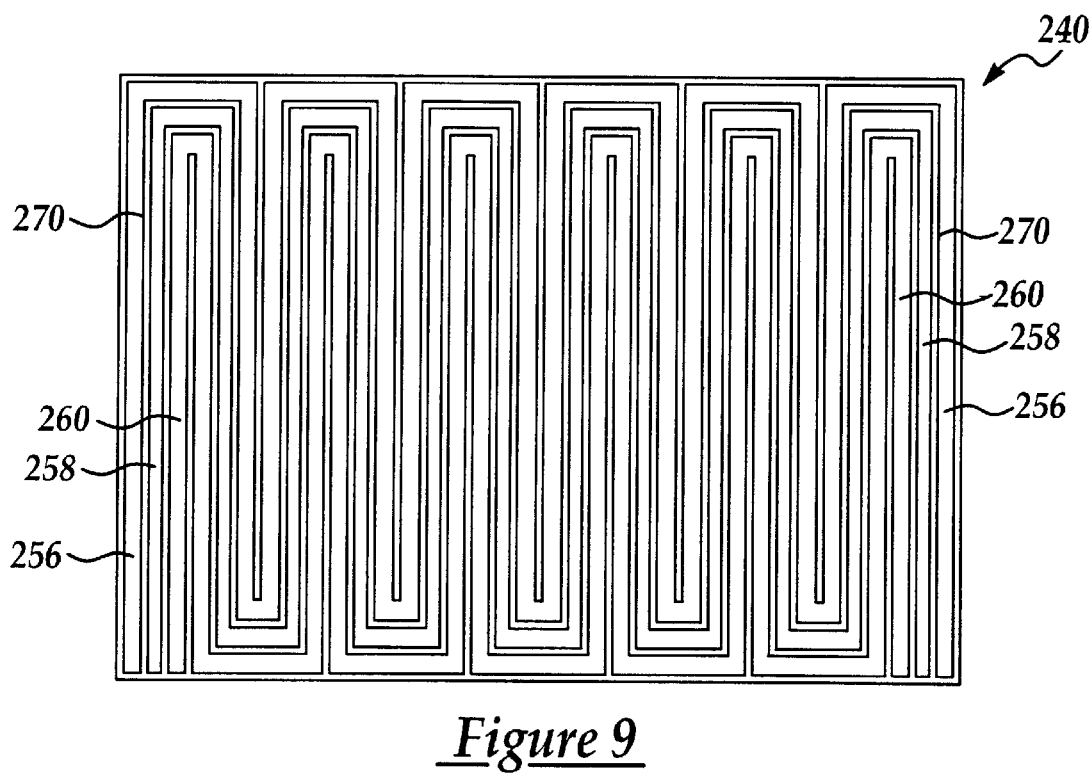
FIG. 9 is a plane view showing a cover plate of the present invention planar field emission color lamp that is formed with serpentine-shaped fluorescent coating strips for red, green and blue.

A plane view similar to that shown in FIG. 8 for the cover plate 240 is shown in FIG. 9. On a surface of the cover plate 240 that faces the base plate 140 when the two plates are assembled together, at least three spaced-apart, serpentine-shaped fluorescent coating strips 256, 258 and 260 are formed. The fluorescent coating strips are formed with a space 270 thereinbetween, which may also be provided in rib sections such as that shown in FIG. 4 of rib 80. Each of the at least three fluorescent coating strips 256, 258 and 260 exhibits one of the primary colors of red, green or blue, even though not necessarily in such order. The flourescent coating strips can be suitably formed of a fluorescent powder for generating the desired colors, for instance, a powder for generating a red light upon energizing of elections is $Y_2O_3$:Eu which emits a spectrum that has a peak at 611 nm with a line band width. A suitable fluorescent powder material for generating a green light may be $L_aPO_4$:$C_e$, Tb which exhibits a spectrum that has a peak at 554 nm with a line band width, or (CeTb) $MgAl_{11}O_{19}$ which exhibits a spectrum that has a peak at 543 nm with a line band width. A suitable fluorescent powder for generating blue color light can be selected from $Sr_5$ $(PO)_3Cl$:Eu which exhibits a spectrum that has a peak at 447 nm, or $(SrCaBa)_5$ $(PO_4)_3$Cl:Eu which exhibits a spectrum that has a peak at 453 nm, or $BaMg_2Al_{16}O_{27}$:Eu which exhibits a spectrum that has a peak at 450 nm. It should be noted that any other fluorescent powder material can be suitably used in the present invention novel apparatus as long as the primary colors of red, green and blue can be generated at sufficient intensity.

It should also be noted that while red, green and blue are illustrated in FIG. 9 in coatings strips 256, 258 and 260, the order of the colors can be arranged in any other desirable manner and does not have to be in the sequence as shown in FIG. 9.

The present invention novel planar color lamp 40 can be constructed by joining the base plate 140 and the cover plate 240 together by a plurality of side panels (not shown). The base plate 140 and the cover plate 240 can be formed of any insulating glass material and can be joined together by the side panels in a sintering process by using ceramic powder. A suitable ceramic powder for such use contains a glass powder, a binder and solvent. Suitable glass materials can be selected from those supplied by Ferro Corporation of Cleveland, Ohio described as a product line of sealing glasses. For instance, a suitable grade of sealing glasses to be used in forming the present invention color lamp chamber is CF 1416, which is a vitreous glass with a thermal expansion coefficient of $82.0 \times 10^{-7}$/° C. (between 0~300° C.), an annealing point of 389° C., a softening point of 463° C., a density of 5.26 gm/cc, a sealing temperature of 513° C. and a sealing time of 15 minutes.

Another suitable grade of material is a vitreous glass of CF 7555 which has a thermal expansion coefficient of $88.0 \times 10^{-7}$/° C. (between 0~300° C.), an annealing point of 370° C., a softening point of 415° C., a density of 5.7 gm/cc, a sealing temperature of 450° C. and a sealing time of 15 minutes. These glass powders are generally available in the form of 100, 200 or 325 mesh powders which are suitable for the present invention joining process for the color lamp chamber.

A suitable width for the present invention emitter stacks or the fluorescent coating strips (shown in FIGS. 8 and 9 as X) is between about 1 mm and 7 mm, and preferably between about 2 mm and about 5 mm. The thickness of the color lamp chamber, or the distance between the cover plate 240 and the base plate 140 is about 6 mm. It should be noted that these dimensions may be suitably changed for a specific application which may require different dimensions.

Figure 7:
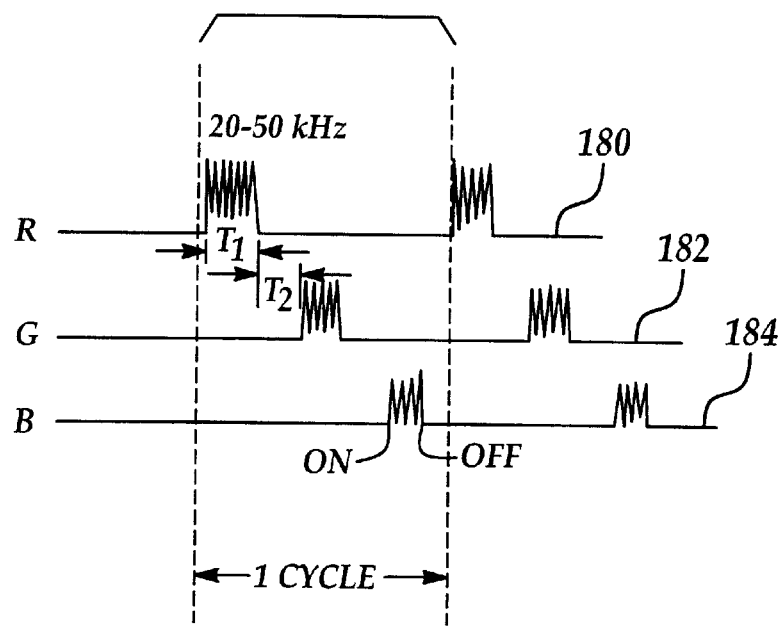
FIG. 7 is a schematic illustrating a timing sequence chart for the three primary colors of red, green and blue for the present invention planar color lamp equipped with nanotube emitters.
Figure 2A:
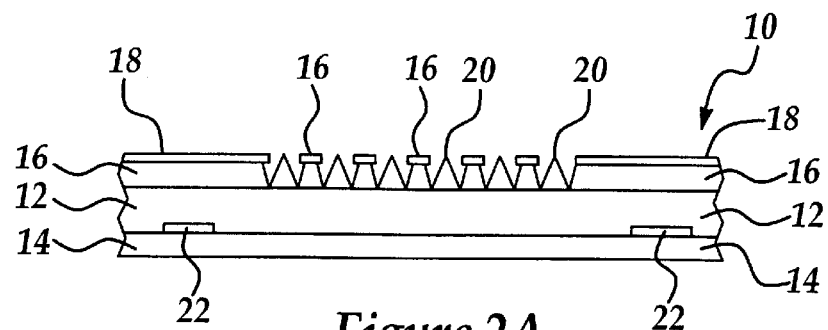
FIG. 2A is an enlarged, cross-sectional view of a conventional field emission display device utilizing microtips for electron emissions.
Figure 2B:
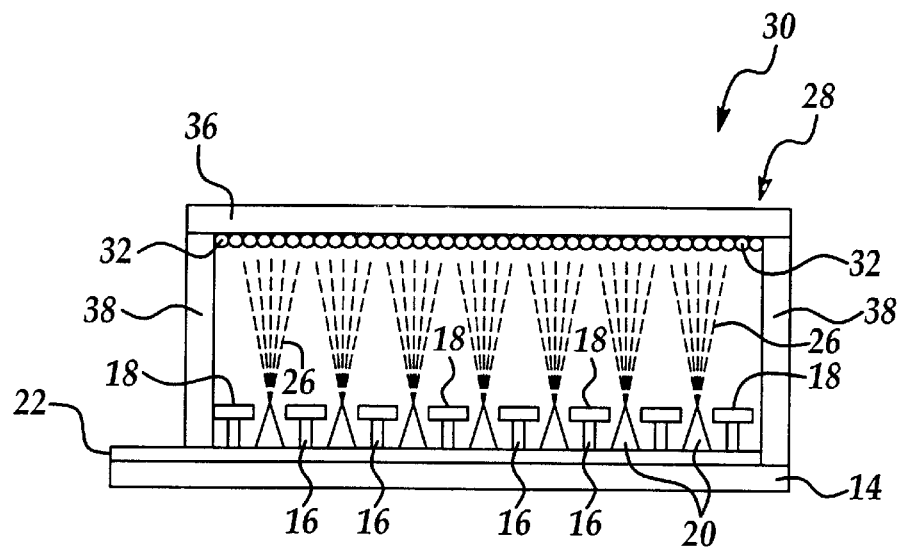
FIG. 2B is an enlarged, cross-sectional view of the conventional field emission display device of FIG. 2A further includes an anode and sidewall panels forming a sealed chamber.
Figure 2C:
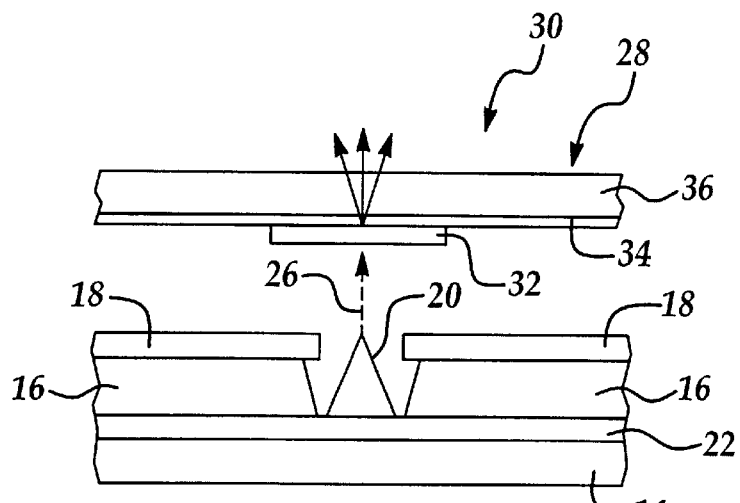
FIG. 2C is an enlarged, partial cross-sectional view of the conventional field emission display device of FIG. 2B illustrating the structure of a single microtip.

The operation of the present invention planar field emission color lamp can be described in a timing sequence chart shown in FIG. 7. In FIG. 7, time sequence traces 180, 182 and 184 each represents a color light of red, green and blue, respectively. The traces each represents a timing sequence for the turn-on/turn-off of each of the emitter stacks, and consequently, each of the fluorescent coating strips for emitting the three primary colors. The red, green and blue lights can be turned on sequentially at a frequency of about 60 Hz. The delay for phosphor is less than 0.1 m sec at 10 KHz. Since the red, green and blue lights are turned on sequentially at 60 Hz frequency, a complete cycle of the three colored lights sequentially turned on requires 16.7 m sec, which relates to 5.6 m sec for each colored light.

As shown in the timing sequence chart of FIG. 7, the turn-on time $T_1$, for any of the three colors is approximately between 1~5 m sec, while the delay time $T_2$ for the liquid crystal is approximately between about 1~2 m sec. The total of $T_1+T_2$ should be about 5.6 m sec. This is the same for the three colors as shown by traces 180, 182 and 184. In a normal operation, the red light is first turned on and then turned off. The green light is then turned on immediately after the red light is turned off, and remains on for a time period between 1~5 m sec. The blue light is then turned on after the green light is turned off for another turn-on time of between 1~5 m sec. The complete cycle for the turn-on/turn-off of all three colors repeats itself for approximately 60 times each second. This supplies a sufficient color response to a liquid crystal display panel for showing a color display at high resolution.

Figure 10:
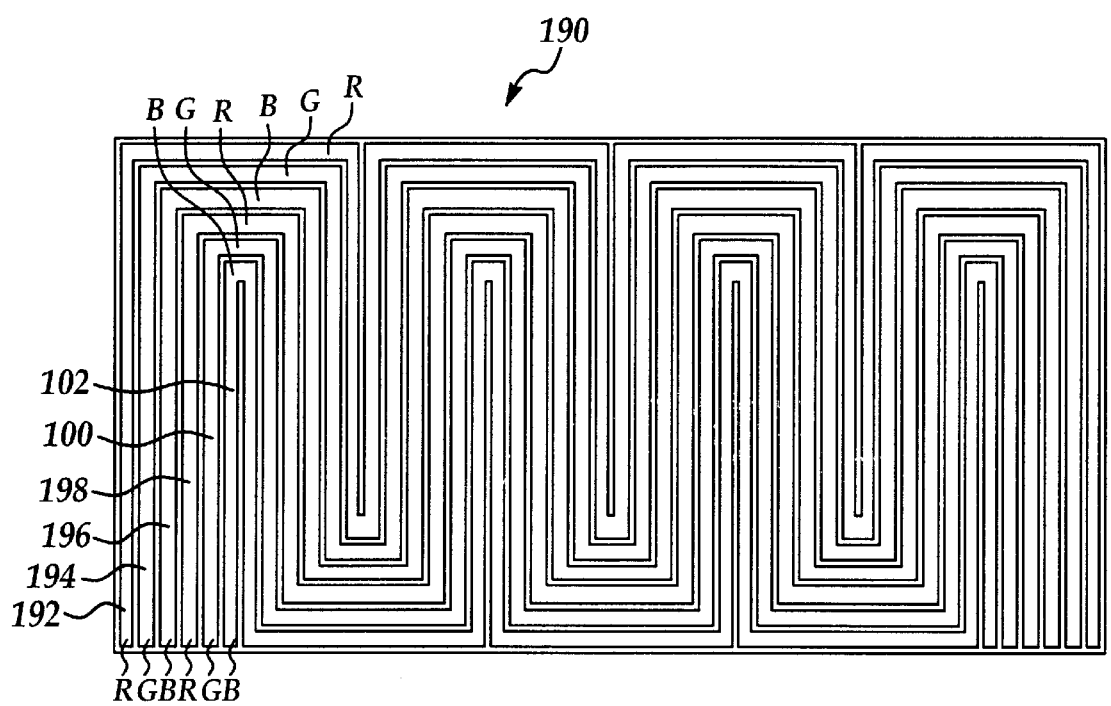
FIG. 10 is a plane view of a base plate of a second embodiment of the present invention color lamp showing six serpentine-shaped emitter stacks for activating color lights of red, green, blue, red, green and blue.

An alternate embodiment of the present invention novel planar field emission color lamp 190 is shown in FIG. 10. Instead of the three spaced-apart, serpentine-shaped structure shown in the preferred embodiment of FIGS. 8 and 9, the alternate embodiment of the present invention shows that a total of 6 spaced-apart, serpentine-shaped structure can be provided in a lamp body. The six serpentine-shaped emitter stacks, or fluorescent coating strips are arranged in an order of red, green, blue, red, green and blue as identified by 192, 194, 196, 198, 100 and 102. It should be noted that, while not shown in FIG. 10, six separate electrodes should be provided to the emitter stacks in a similar manner as shown in FIG. 8 for charging the nanotube emitters contained in the emitter stacks for emitting electrons. Similar fluorescent powder coating materials may also be used to provide the desired color lights. This alternate embodiment does not imply that the present invention novel planar color lamp is only limited to the use of six serpentine-shaped structure, an even larger number of spaced-apart, serpentine-shaped emitter stacks and fluorescent coating strips may be used as long as the structure can be constructed without great difficulty.

The benefits and the advantages of the present invention novel planar field emission color lamp have therefore been amply described in the above description and in the appended drawings of FIGS. 3–10. The present invention novel planar field emission color lamp can be advantageously used as a backlight source for a flat panel display device for illumination. By using the present invention novel planar color lamp, the conventional color filters normally required is completely eliminated. The present invention novel planar color lamp therefore combines the desirable functions of a backlight and color filters into one convenient package which can be fabricated by thick film printing techniques for forming the nanotube emitter stacks. High quality color illumination for the flat panel display units can thus be achieved at low fabrication cost.

While the present invention has been described in an illustrative manner, it should be understood that the terminology used is intended to be in a nature of words of description rather than of limitation.

Furthermore, while the present invention has been described in terms of a preferred and an alternate embodiment, it is to be appreciated that those skilled in the art will readily apply these teachings to other possible variations of the inventions.

The embodiment of the invention in which an exclusive property or privilege is claimed are defined as follows:

What is claimed is:

1. A planar field emission color lamp with nanotube emitters comprising:
   a lamp body having an electrically insulating cover plate, an electrically insulating base plate, two sidewalls and two end walls forming a sealed cavity therein,
   at least three spaced-apart, serpentine-shaped emitter stacks formed on said electrically insulating base plate, each of said at least three serpentine-shaped emitter stacks being positioned substantially parallel to said two end walls and comprises a layer of a first electrically conductive material and a layer of nanotube emitter on top,
   a layer of a second electrically conductive material on a surface of said electrically insulating cover plate facing said cavity,
   at least three spaced-apart, serpentine-shaped fluorescent coating strips on said layer of second electrically conductive material corresponding in a mirror image relationship to said at least three emitter stacks when said cover plate is positioned over said base plate forming said lamp body, each of said at least three fluorescent coating strips being adapted for emitting a red, green or blue light upon activation by electrons emitted from said at least three emitter stacks, and
   a plurality of electrically insulating spacers inbetween said cover plate and said base plate for maintaining a preset spacing thereinbetween.

2. A planar field emission color lamp with nanotube emitters according to claim 1, wherein said layer of nanotube emitter being formed of a mixture of nanometer dimensioned hollow tubes and a binder material.

3. A planar field emission color lamp with nanotube emitters according to claim 1, wherein said electrically insulating cover plate further comprises a black matrix layer inbetween said at least three spaced-apart, serpentine-shaped fluorescent coating strips.

4. A planar field emission color lamp with nanotube emitters according to claim 3, wherein said black matrix layer being formed of an electrically conductive material.

5. A planar field emission color lamp with nanotube emitters according to claim 1, wherein said cover plate and said base plate are formed of a ceramic material that is substantially transparent.

6. A planar field emission color lamp with nanotube emitters according to claim 1, wherein said layer of a first electrically conductive material is a cathode for said planar field emission color lamp.

7. A planar field emission color lamp with nanotube emitters according to claim 1, wherein said layer of a first electrically conductive material is a silver paste.

8. A planar field emission color lamp with nanotube emitters according to claim 1, wherein said layer of second electrically conductive material is an anode for said planar field emission color lamp.

9. A planar field emission color lamp with nanotube emitters according to claim 1, wherein said layer of second electrically conductive material is formed of indium-tin-oxide (ITO).

10. A planar field emission color lamp with nanotube emitters according to claim 1, wherein said layer of nanotube emitter being formed of a mixture of nanometer dimensioned hollow tubes of carbon, diamond or diamond-like carbon and a polymeric-based binder.

11. A planar field emission color lamp with nanotube emitters according to claim 1, wherein each of said at least three fluorescent coating strips emits a light of red, green or blue that is different than the light emitted by its immediate adjacent strips when activated by electrons from said at least three emitter stacks.

* * * * *